(12) United States Patent
Toda et al.

(10) Patent No.: US 7,329,994 B2
(45) Date of Patent: Feb. 12, 2008

(54) LIGHTING SYSTEM FOR VEHICLE

(75) Inventors: Atsushi Toda, Shizuoka (JP); Hideki Uchida, Shizuoka (JP); Toshikazu Tomono, Shizuoka (JP)

(73) Assignee: Koito Manufacturing Co., Ltd., Minato-ku, Tokyo (JP)

( * ) Notice: Subject to any disclaimer, the term of this patent is extended or adjusted under 35 U.S.C. 154(b) by 0 days.

(21) Appl. No.: 11/353,720

(22) Filed: Feb. 13, 2006

(65) Prior Publication Data

US 2006/0181889 A1 Aug. 17, 2006

(30) Foreign Application Priority Data

Feb. 14, 2005 (JP) .......................... P.2005-035470
Oct. 7, 2005 (JP) .......................... P.2005-295225

(51) Int. Cl.
*B60Q 1/02* (2006.01)
(52) U.S. Cl. .......................... 315/82; 315/77; 315/291; 307/10.1; 307/10.8
(58) Field of Classification Search .................. 315/77, 315/82, 209 R, 291, 307–308, 312; 340/458, 340/933; 307/10.1, 10.8; 362/459–460, 362/465, 800
See application file for complete search history.

(56) References Cited

U.S. PATENT DOCUMENTS 5,293,077 A * 3/1994 Seki et al. .................. 307/10.8
5,666,005 A * 9/1997 Watford ...................... 307/10.8
6,917,166 B2 * 7/2005 Ito et al. ...................... 315/291
2003/0025465 A1 * 2/2003 Swanson et al. ............ 315/291
2003/0226954 A1 * 12/2003 Ohmi .......................... 250/221
2003/0227257 A1 * 12/2003 Serizawa et al. ............. 315/77
2004/0061450 A1 * 4/2004 Ito et al. ...................... 315/160
2006/0091827 A1 * 5/2006 Chevalier et al. ........... 315/291

FOREIGN PATENT DOCUMENTS

| DE | 4011608 A1 | 10/1990 |
| DE | 10208462 A1 | 9/2003 |
| DE | 102004020556 A1 | 3/2005 |
| EP | 0 805 074 A1 | 11/1997 |
| JP | 2004-122913 | 4/2004 |

* cited by examiner

*Primary Examiner*—Haissa Philogene
*Assistant Examiner*—Tung X Le
(74) *Attorney, Agent, or Firm*—Fish & Richardson P.C.

(57) ABSTRACT

A lighting system for a vehicle includes a lamp and a deciding circuit to detect the number of abnormal light emitting elements or the abnormal elements in the lamp. The deciding circuit may be connected to a disconnection detecting circuit by one signal line to detect an abnormality of a particular one light emitting element, wherein the disconnection detecting circuit is adapted to provide to the signal line a potential corresponding to the particular light emitting element whose disconnection is detected and the deciding circuit is adapted to identify the abnormal light emitting element on the basis of the potential of the signal line.

14 Claims, 12 Drawing Sheets

$r1 = r2 = r3 = ra$
$1/2 \cdot ra < rb < ra$ $rb = 1/2 \cdot ra$ rb = r1 < r2 (2·r1) < r3 (4·r1)

NORMAL

DISCONNECTION OF L1

DISCONNECTION OF L1 AND L2

$3/2 \cdot Rb = r1 = r2 = r3 = r4$

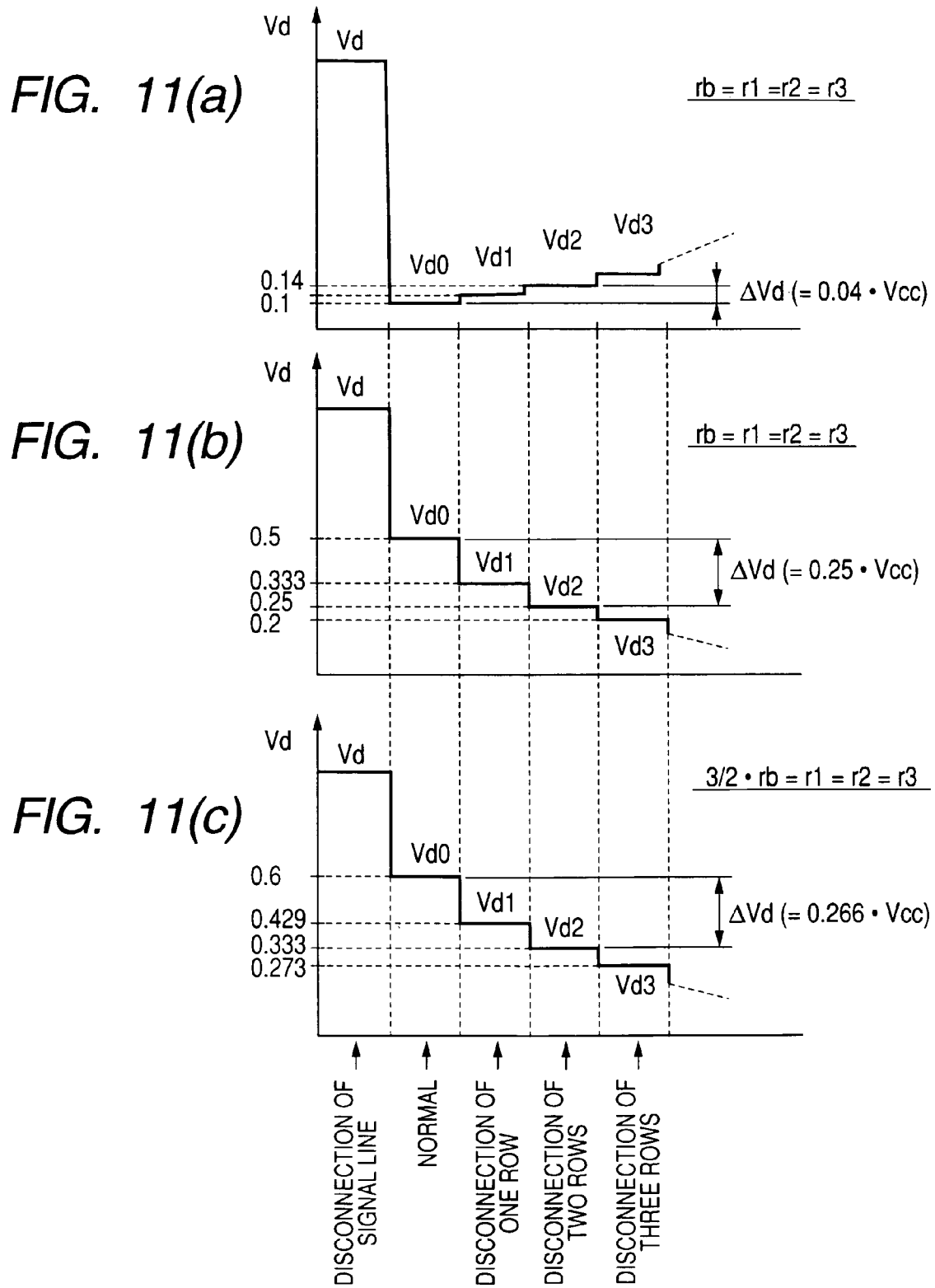

LIGHTING SYSTEM FOR VEHICLE

TECHNICAL FIELD

The present disclosure relates to a lamp having a plurality of light emitting elements as a light source and, in particular, to a lighting system for a vehicle with a control unit for controlling the light emission of the light emitting elements.

BACKGROUND

A lamp for a vehicle may include a light emitting element, such as a light emitting diode, whose consumed electric power is lower than that of an electric bulb and whose life is longer than that of the electric bulb. In such a lamp, as the quantity of light emission of the light emitting element is lower than that of the electric bulb, the light source is formed with multiple light emitting elements. For instance, as shown in FIG. 8, in the lamp LP, multiple light emitting diode rows L1, L2 and L3 respectively have a prescribed number of light emitting diodes 21 connected in series. The light emitting diode rows L1, L2 and L3 are connected in parallel with a power terminal TV and an earth terminal TG to emit light. In the lamp having many light emitting diodes as in the light source described above, even when some of the light emitting diodes do not emit light as the result of an abnormality such as a disconnection, the light emission of other light emitting elements can satisfy a luminous intensity distribution standard required for the lamp. However, when the number of abnormal light emitting diodes increases, the luminous intensity distribution standard may not be satisfied. Accordingly, a disconnection detecting circuit needs to be provided for detecting an abnormality of the light emitting diodes, especially, the disconnection of the light emitting diodes.

As shown in FIG. 12, to detect the disconnection of the light emitting diode, a disconnection detecting circuit 22A may be provided for detecting the disconnection of multiple light emitting diode rows L1, L2 and L3, respectively. In the disconnection detecting circuit 22A, a potential change generated when the disconnection is detected is employed. That is, the disconnection detecting circuit 22A includes disconnection detecting parts D1, D2 and D3 for respectively detecting the disconnection of the light emitting diode rows L1, L2 and L3. The disconnection detecting parts D1, D2 and D3 include, respectively, transistors Tr1, Tr2 and Tr3 that turn on and off both end voltages of load resistances RL1, RL2 and RL3 connected in series to the light emitting diode rows L1, L2 and L3 in accordance with base resistances RB1, RB2 and RB3 as inputs. Collector voltages generated by collector resistances R1, R2 and R3 of the transistors Tr1, Tr2 and Tr3 are respectively provided to a deciding circuit 5A of a control unit CNT through signal lines SL1, SL2 and SL3. In this example, the three disconnection detecting parts are provided for the three light emitting diode rows. Accordingly, the disconnection detecting parts D1, D2 and D3 are respectively connected to the deciding circuit 5A through the signal lines SL1, SL2 and SL3. The deciding circuit 5A recognizes the collector voltage when the disconnection arises in the light emitting diode rows and the transistor is turned off through the signal lines SL1, SL2 and SL3, and the deciding circuit compares the recognized collector voltage with a reference voltage to decide whether disconnection of the light emitting diode rows, that is, an abnormality, has occurred.

In this technique, the deciding circuit 5A recognizes the signal line in which the voltage changes so that the deciding circuit 5A can decide whether an abnormality has occurred in the disconnection detecting parts D1, D2 and D3 connected to the signal line, that is, the disconnection of the light emitting diode rows L1, L2 and L3. Further, the deciding circuit recognizes the light emitting row corresponding to the abnormal disconnection detecting part so that the deciding circuit can recognize the number of the light emitting diode rows in which the abnormality arises in the lamp or positions where the light emitting diode rows are arranged in the lamp and properly decide whether or not the lamp satisfies the prescribed luminous intensity distribution standard. However, in this technique, since the signal lines need to be allowed to correspond to the light emitting diode rows and the disconnection detecting parts on a 1-to-1 basis, the number of signal lines needs correspond to the number of light emitting diode rows. Accordingly, the number of wirings for connecting the deciding circuit to the lamp is increased. Moreover, when the lamps in the right and left sides of a motor vehicle are respectively connected to the deciding circuit, the motor vehicle needs two times as many as the number of wirings. Consequently, the number of wires for connecting the lamps to the deciding circuit increases, thus increasing weight, size and cost.

Patent document JP-A-2004-122913 discloses a structure of a disconnection detecting circuit for detecting the disconnection of light emitting diode rows. In particular, that document discloses a structure in which disconnection detecting parts respectively in light emitting diode rows are connected in common to one signal line and connected to a deciding circuit of a control unit. The change of the potential of the signal line is recognized by the deciding circuit to decide whether an abnormality has occurred in the light emitting diode rows. Therefore, one signal line for connecting a lamp to the control unit may be effectively used to reduce a size, weight and a cost.

However, in the technique disclosed in JP-A-2004-122913, as the plurality of disconnection detecting parts in the light emitting diode rows are connected in common to one signal line, the light emitting diode row in which an abnormality arises cannot be identified. That is, in the technique disclosed in JP-A-2004-122913, the change in the potential of the signal line makes it possible to decide the generation of an abnormality in any of the light emitting diode rows. However, regardless of whether the abnormality arises in one of the light emitting diode rows or the abnormality arises multiple light emitting diode rows, the change in the potential of the signal line is constant, so that the specific abnormalities cannot be identified. Further, when the abnormality arises in any of the light emitting diode rows, since the change in potential of the signal line is the same, it cannot be decided where the light emitting diode row in which the abnormality arises is arranged in the lamp. Accordingly, it cannot be decided whether the abnormality is located within a range where the lamp satisfies a luminous intensity distribution standard and functions normally, or whether the abnormality is located within a range where the lamp does not satisfy the luminous intensity distribution standard. Thus, the disconnection detecting circuit provided in the lamp cannot be effectively used.

SUMMARY

The present disclosure describes a lighting device for a vehicle in which a lamp is connected to a deciding circuit by one signal line and the number of abnormal light emitting elements can be detected and identified. For example, the generation of an abnormality in one or two light emitting elements can be decided with high accuracy. Further, the present disclosure describes a lighting system for a vehicle that can determine a position where an abnormal light emitting element is arranged in a lamp.

In one aspect, the present disclosure describes a lighting system for a vehicle including a lamp having a light emitting part with multiple light emitting elements connected in parallel and a disconnection detecting circuit for detecting the disconnection of each light emitting element. The lighting system may include a deciding circuit that is connected to the disconnection detecting circuit by one signal line to detect the abnormality of the light emitting element. The disconnection detecting circuit may provide as an output a potential corresponding to the light emitting element whose disconnection is detected on the signal line and the deciding circuit may identify the abnormal light emitting element on the basis of the potential of the signal line. The disconnection detecting circuit may have multiple disconnection detecting parts for detecting, respectively, the disconnection of the light emitting elements and may provide as an output respective different potentials in accordance with the detection of the disconnection in the disconnection detecting parts.

Further, the disconnection detecting circuit may include a reference resistance connected between the signal line and a first potential, and a detecting resistance connected between the signal line and a second potential, when each disconnection detecting part does not detect the disconnection. Otherwise, the disconnection detecting circuit includes the reference resistance connected between the signal line and the first potential, and a detecting resistance connected between the signal line and the second potential when each disconnection detecting part detects the disconnection. In this case, the resistance value of the reference resistance is preferably lower than the resistance value of the detecting resistance. Further, in the latter case, the disconnection detecting circuit preferably includes a detecting resistance for detecting the disconnection of the signal line that is connected between the signal line and the second potential and constructed so as not to supply electric current when the signal line is disconnected or when a supply power source to the light emitting part stops.

Various advantages may be present in some implementations. For example, a potential provided as an output to the signal line is changed in accordance with the number of the light emitting elements whose disconnection is generated or positions where the light emitting elements are arranged in the lamp. The deciding circuit can determine the number of the abnormal light emitting elements or the positions where the abnormal light emitting elements are arranged in the lamp in accordance with the potential of the signal line. Therefore, the lamp may be connected to the deciding circuit simply by one signal line so that it can be determined, on the basis of a decision in the deciding circuit, whether or not the lamp in which the abnormalities arise in the light emitting elements satisfies a prescribed luminous intensity distribution standard. The small size and light weight of a wire structure for connecting the lamp to the deciding circuit can be realized, and the disconnection detecting circuit or the deciding circuit formed as the lighting device for a vehicle can be used. A difference between the potential when the abnormality arises in one or two light emitting elements and the potential during a normal time can be increased to obtain a deciding margin in the deciding circuit and realize a precise decision. Further, an abnormality resulting from disconnection of the signal line can be decided.

Other features and advantages may be apparent from the following detailed description, the accompanying drawings and the claims.

BRIEF DESCRIPTION OF THE DRAWINGS

FIG. 11 is a voltage characteristic view of the disconnection detecting circuit when the number of light emitting diode rows is nine.

FIRST EMBODIMENT

Figure 1:
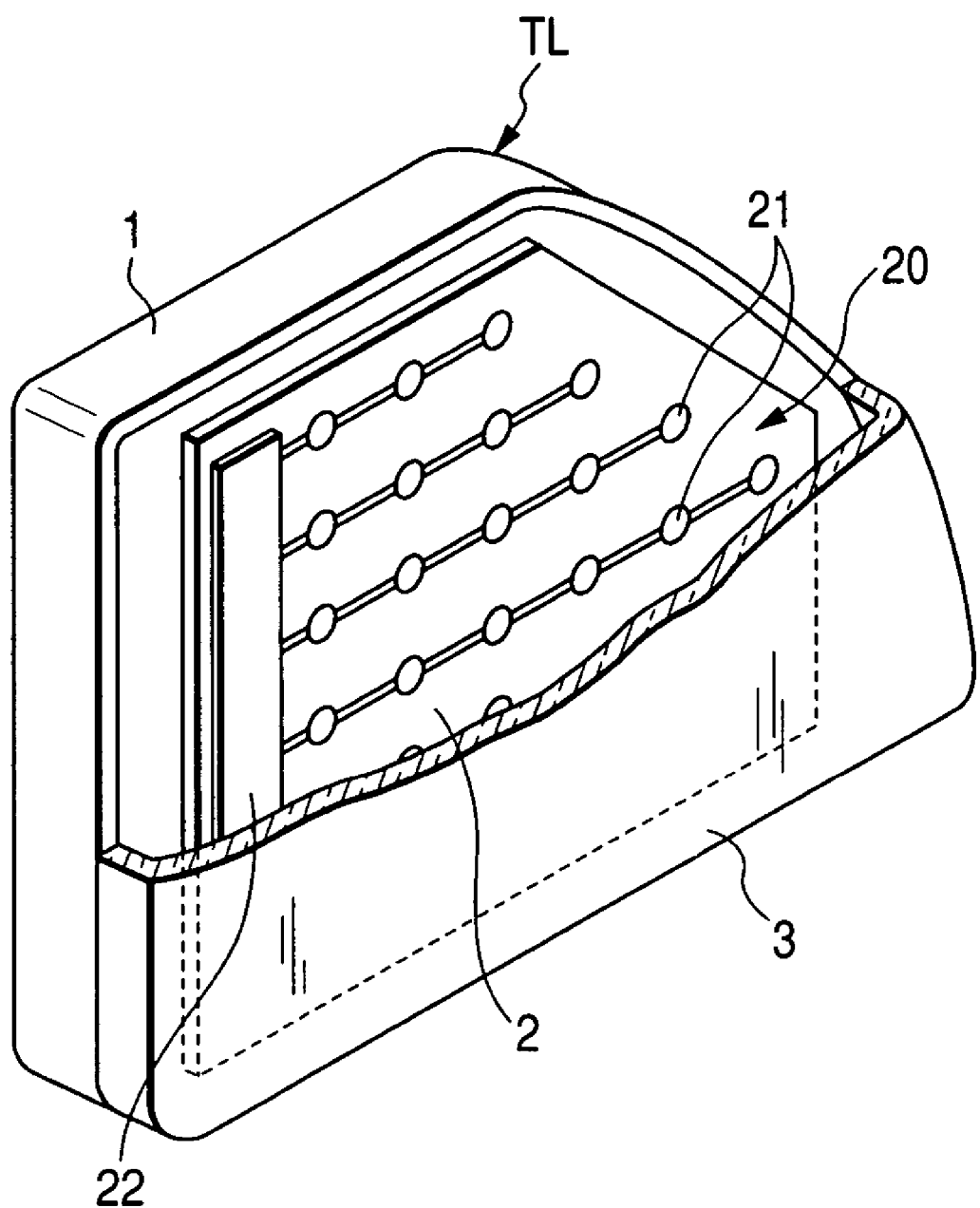
FIG. 1 is a partial perspective view of a tail lamp to which the present invention may be applied.

Examples of embodiments will be described by referring to the drawings. FIG. 1 shows an embodiment of a lighting device for a motor vehicle, for instance, a tail lamp TL for the motor vehicle. A circuit board 2 is internally disposed in a lamp body 1 formed in a dish shaped vessel. Light emitting diodes (LED) 21, which serve as light emitting elements, are arranged and mounted on the circuit board. In a front surface opening of the lamp body 1, a lens 3 is attached to seal the circuit board 2. The circuit board 2 is formed with a printed circuit board and the light emitting diodes 21 are mounted on the surface of the circuit board 2 in a prescribed arrangement. The light emitting diodes 21 respectively form light emitting circuits relative to print wiring to form a light emitting part 20 that emits light when electric current is supplied. A discrete type light emitting diode or a chip type light emitting diode may be used as the light emitting diode 21. Further, between the circuit board 2 and the lens 3, a reflector may be arranged for condensing or diffusing the light from the light emitting diodes 21. In the circuit board 2, a disconnection detecting circuit 22 is provided for detecting the abnormality of the light emitting diodes 21 forming the light emitting part 20 and, herein, the disconnection of the light emitting diodes 21 and wiring for electrically connecting the light emitting diodes.

Figure 2:
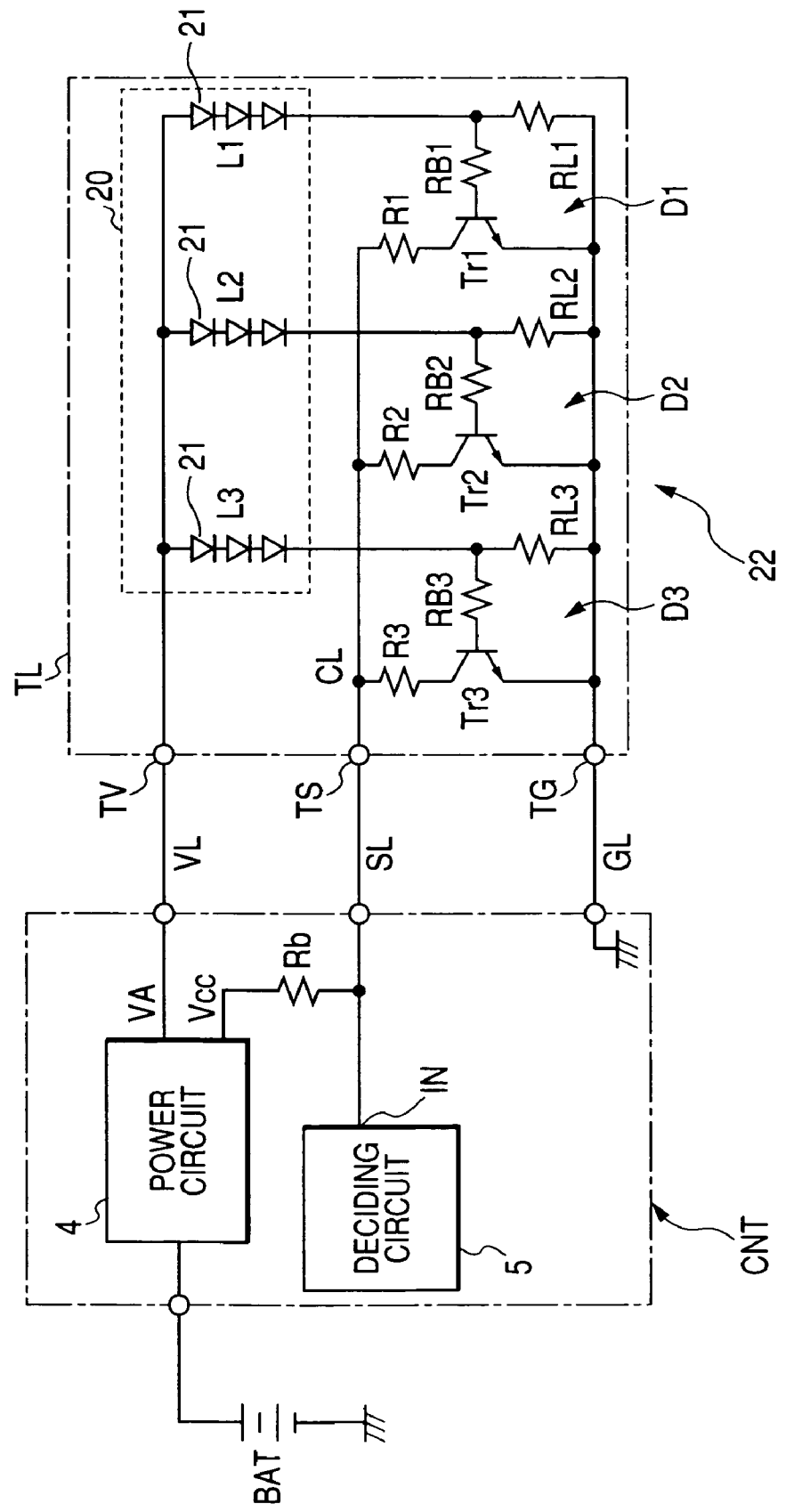
FIG. 2 is a circuit block diagram of a first embodiment.

As shown in FIG. 2, the tail lamp TL is connected to a control unit CNT, and a light emission is controlled by the control unit CNT. The control unit CNT may be provided in a vehicle body side separately from the tail lamp TL. In contrast, the control unit may be formed integrally with the tail lamp TL. FIG. 3 is an equivalent circuit diagram of the tail lamp TL and the control unit CNT. In the tail lamp TL, the light emitting part 20 in the circuit board 2 has a prescribed number of light emitting diodes connected in series to form light emitting diode rows. The light emitting diode rows are connected in parallel between a power terminal TV and an earth terminal TG. To simplify the explanation, the three light emitting diodes 21 are respectively connected in series to form first to third light emitting diode rows L1, L2 and L3. Further, the first to third light emitting diode rows L1, L2 and L3 are connected in parallel with a power source. All The light emitting diodes are adapted to emit light when prescribed voltage is supplied to the power terminal TV.

On the other hand, in the disconnection detecting circuit 22, first to third disconnection detecting parts D1, D2 and D3 are respectively connected to the first to third light emitting diode rows L1, L2 and L3. The disconnection detecting parts D1, D2 and D3 respectively include load resistances RL1, RL2 and RL3 connected in series to the light emitting diode rows L1, L2 and L3 and transistors Tr1, Tr2 and Tr3 turned on and off by voltage generated at both ends of the load resistances RL1, RL2 and RL3. The bases of the transistors Tr1, Tr2 and Tr3 are respectively connected to the load resistances RL1, RL2 and RL3 through base resistances RB1, RB2 and RB3. Collector resistances R1, R2 and R3 are respectively connected to the collectors of the transistors Tr1, Tr2 and Tr3. The collector resistances R1, R2 and R3 of the plurality of disconnection detecting parts D1, D2 and D3 are respectively connected to a common line CL connected to a signal terminal TS.

The power terminal TV and the earth terminal TG of the circuit board 2 of the tail lamp TL are connected to the control unit CNT by a pair of power wires VL and GL. The signal terminal TS is connected to the control unit CNT by a signal line SL. The control unit CNT includes a power circuit 4 and a deciding circuit 5. The power circuit 4 generates light emitting voltage VA for driving the light emitting diodes to emit light by using a battery BAT mounted as a power source on a vehicle and for providing the operating voltage Vcc of the deciding circuit 5. The light emitting voltage VA is supplied to the power terminal TV by the power wire VL and the light emitting diodes 21 are allowed to emit light by the light emitting voltage VA.

The deciding circuit 5 is for deciding whether an abnormality of the light emitting part 20 has occurred, that is, deciding occurrence of an abnormality of the light emitting diodes 21 in accordance with voltage inputted to an input terminal IN. The signal line SL, which is connected to the signal terminal TS of the tail lamp TL, is connected to the input terminal IN. Reference resistance Rb is connected between the signal line SL and the operating voltage Vcc to pull up the signal line SL to the operating voltage Vcc. The reference resistance Rb serves as a part of elements forming the disconnection detecting circuit 22. The reference resistance Rb is disposed in the control unit CNT side connected to the tail lamp TL.

According to the above-described construction, when the light emitting voltage VA generated in the power circuit 4 of the control unit CNT is supplied to the circuit board 2 in the tail lamp TL through the power wires VL and GL, if the light emitting diodes 21 are normal, all of them emit the light, and the light emitting part 20 emits the light with a prescribed quantity of light emission. Thus, the tail lamp TL is lighted. When all the light emitting diodes emit lights respectively in the light emitting diode rows L1 to L3, a prescribed electric current is supplied respectively to the light emitting diode rows, so that both end voltages of the load resistances RL1 to RL3 of the disconnection detecting parts D1 to D3 are respectively provided to the bases of the transistors Tr1, Tr2 and Tr3 to turn on the transistors Tr1, Tr2 and Tr3. Accordingly, the collector resistances R1, R2 and R3 are connected to the common line CL to supply a collector current by the operating voltage Vcc through the signal line SL. Thus, voltage Vd obtained by dividing the operating voltage Vcc by the reference voltage Rb and the collector resistances R1, R2 and R3 is provided to the input terminal IN of the deciding circuit 5. When disconnection of the light emitting diode rows L1, L2 and L3 is not detected, that is, during normal operation, the collector resistances R1, R2 and R3 are connected to the common line CL, or between the signal line SL and the earth terminal TG to pull down the signal line SL to an earth potential side. Thus, the collector resistances R1, R2 and R3 function as detecting resistances for detecting normality.

Figure 3A:
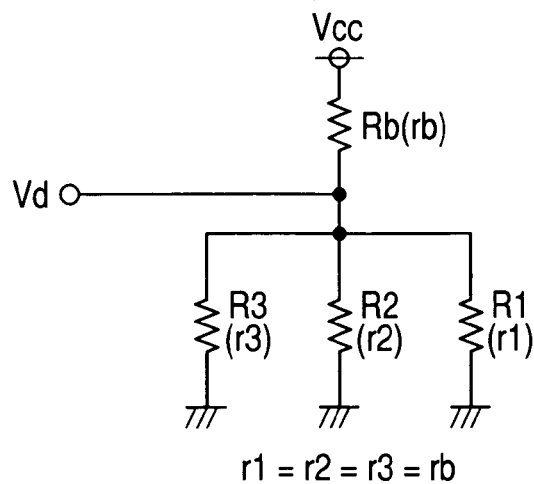
FIG. 3 shows an equivalent circuit diagram of a disconnection detecting circuit and a voltage characteristic view for explaining a detecting operation.

As shown in FIG. 3(a), it is assumed that the resistance value of the collector resistance R1 of the first disconnection detecting part D1 is r1, the resistance value of the collector resistance R2 of the second disconnection detecting part D2 is r2, the resistance value of the collector resistance R3 of the third disconnection detecting part D3 is r3, and the resistance value of the reference resistance Rb is rb. As the three collector resistances R1, R2 and R3 are respectively connected in parallel, if the electric current is supplied to the collector resistances R1, R2 and R3 of the disconnection detecting parts D1, D2 and D3, divided voltage Vd provided to the deciding circuit 5 is expressed by the following formula:

$$Vd=[rx/(rx+rb)]\cdot Vcc \qquad \text{(formula a)}$$

$$\text{where } rx=1/(1/r1+1/r2+1/r3) \qquad \text{(formula b)}.$$

Assuming that the resistance value rb of the reference resistance Rb and the resistance values r1, r2 and r3 of the first to third collector resistances R1, R2 and R3 are all equal to rb, then, when the light emitting diode rows L1, L2 and L3 are respectively normal, the following results are obtained.

$$rx=rb/3$$

$$Vd=(1/4)\cdot Vcc.$$

When an abnormality arises in the light emitting diode included in any of the light emitting diode rows such that light is not emitted, the electric current is not supplied to the light emitting diode row including the light emitting diode that has a disconnected state. For instance, when any one of the light emitting diode rows is abnormal, the electric current is not supplied to the load resistances RL1, RL2 and RL3 of the abnormal disconnection detecting parts D1, D2 and D3, so that the transistors Tr1, Tr2 and Tr3 of the disconnection detecting parts D1, D2 and D3 are turned off. Therefore, the collector resistances R1, R2 and R3 of the transistors are not connected between the signal line SL and the earth terminal TG. Accordingly, in the formula (b), rx is expressed by rx=rb/2. From Vd in the formula (a), the following result is obtained.

$$Vd1=(1/3)\cdot Vcc.$$

When two light emitting diode rows are abnormal, rx=rb and $$Vd2=(1/2)\cdot Vcc.$$

When all the three light emitting diode rows become abnormal, rx=0 and

Vd3=Vcc

Figure 3B:
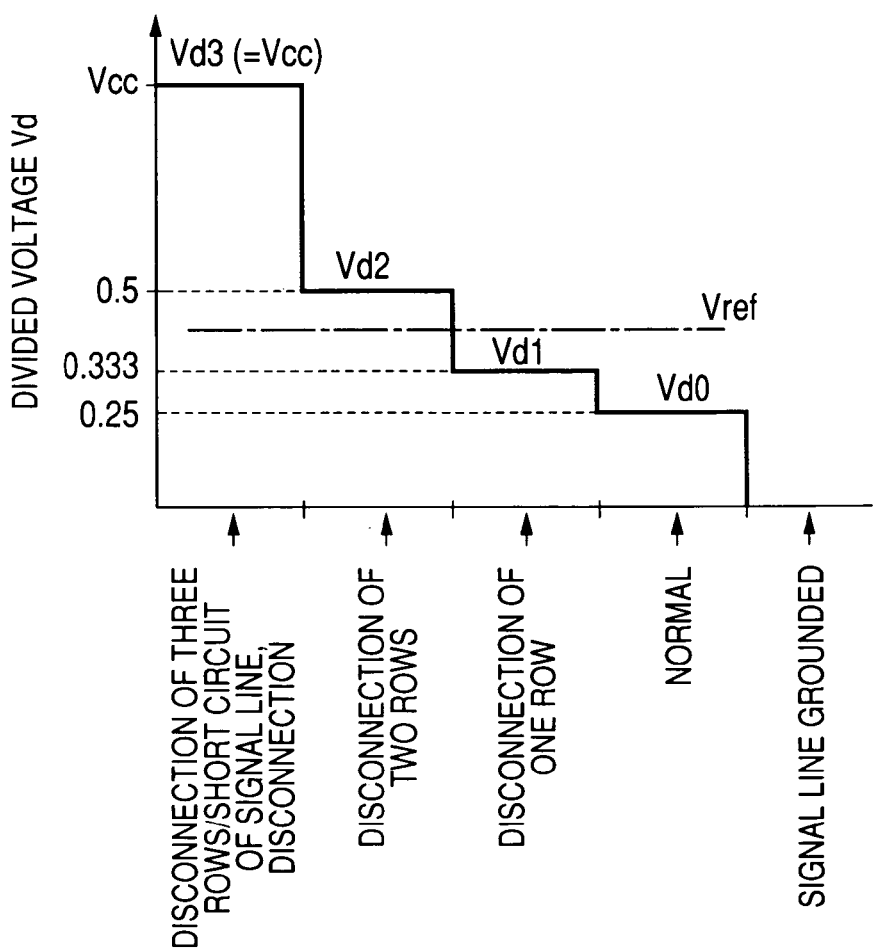

As described above, divided voltages Vd obtained from the abnormalities of the three light emitting diode rows are respectively shown in FIG. 3(b). Since the divided voltages Vd provided to the deciding circuit 5 differ depending on the number of the abnormal light emitting diode rows, the deciding circuit 5 recognizes the divided voltage Vd so that the deciding circuit 5 can determine the number of the abnormal light emitting diode rows. Accordingly, for instance, there may a situation in which, if one light emitting diode row becomes abnormal, the luminous intensity distribution standard in the tail lamp TL can be satisfied, and if two light emitting diode rows become abnormal, the luminous intensity distribution standard of the tail lamp is not satisfied. In that case, reference voltage Vref is set between Vd1 and Vd2 in the deciding circuit 5. Thus, the divided voltage Vd may be referred to by the reference voltage Vref to decide the abnormality of the tail lamp TL.

Figure 4A:
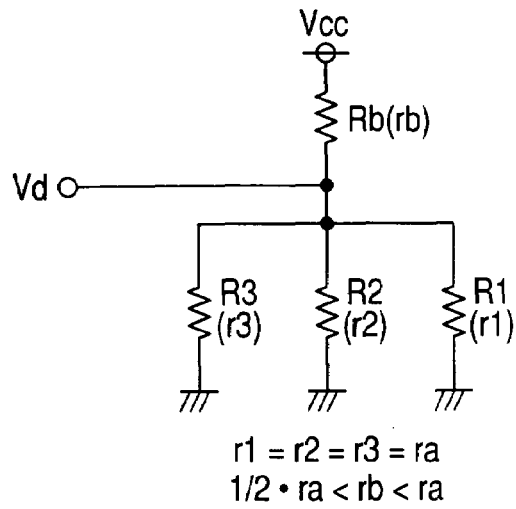
FIG. 4 shows an equivalent circuit diagram of a modified example of the disconnection detecting circuit and a voltage characteristic view.

In the first embodiment, since the resistance values r1, r2 and r3 of the collector resistances R1, R2 and R3 of the disconnection detecting parts D1, D2 and D3 are respectively equal to the resistance value rb of the reference resistance Rb, a voltage difference between the divided voltage Vd2 (when the two light emitting diode rows become abnormal) and the divided voltage Vd1 (when the one light emitting diode row becomes abnormal) is lower than 0.17 Vcc. Accordingly, a margin of the reference voltage Vref when disconnection of a first row occurs and disconnection of a second row occurs is decreased so that a deciding accuracy needs to be improved. Thus, as shown in FIG. 4(a), assuming that r1, r2 and r3 are respectively equal to ra, the resistance value rb of the reference resistance Rb is set to a resistance value located within a range of ½ as small as the resistance value ra of each collector resistance to ra. That is, rb is expressed as described below:

1/2·ra<rb<ra        (formula c).

In such a way, the voltage difference between Vd1 and Vd2 can be increased more than the characteristics shown in FIG. 3, and a voltage range can be effectively enlarged when the reference voltage Vref is set to mitigate the deciding accuracy.

The above-described formula (c) may be obtained as described below. Namely, the divided voltage Vd1 during the disconnection of the first row is represented by the following formula:

Vd1=Vcc·[ra/(ra+rb)]

The divided voltage Vd2 during the disconnection of the second row is represented by the following formula:

Vd2=Vcc·[1/2·ra/(1/2·ra+rb)]

Thus, the voltage difference of Vd2−Vd1 may be calculated from both the formulas. Assuming that ra is a constant and rb is a variable in the calculation formula, such a relation between ra and rb as to increase the value of Vd2−Vd1 is obtained.

Figure 4B:
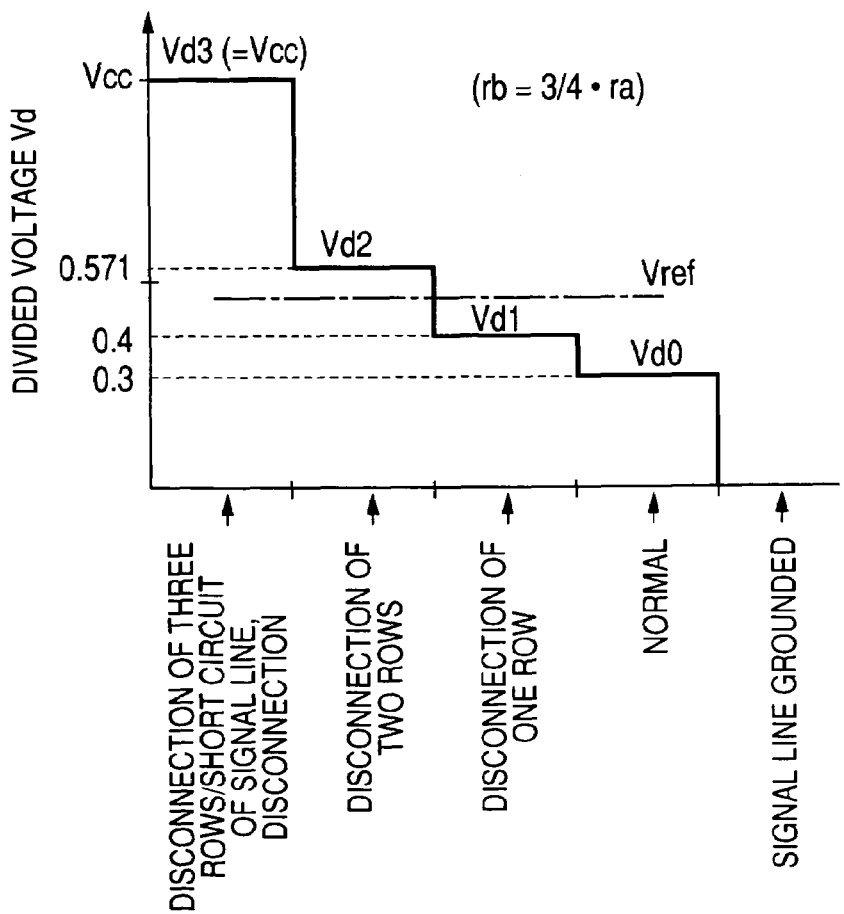

Referring to FIG. 4(b), an example satisfying the formula (c) is shown in which rb is equal to ¾·ra. Voltage Vd0 during a normal time is expressed by:

Vd0=0.3·Vcc.

Voltage Vd1 when one light emitting diode row is abnormal (disconnected) is expressed by:

Vd1=0.4·Vcc.

Vd2 when the two light emitting diode rows become abnormal is expressed by:

Vd2=0.571·Vcc.

Thus, the divided voltages Vd1 and Vd2 during disconnection of the first row and during disconnection of the second row are respectively obtained as shown in FIG. 4(b), and the voltage difference between Vd1 and Vd2 can be made larger than 0.17·Vcc, which apparently is increased more than the voltage difference in the characteristics in FIG. 3(b).

Similarly, to increase a potential difference between the divided voltage Vd0 when all three light emitting diode rows are normal and the divided voltage Vd1 when one light emitting diode row is abnormal (one row is disconnected) so as to increase a margin of the reference voltage Vref for decision, the relation of ra and rb may have the following relation in accordance with the above-described calculation:

1/5·ra<rb<ra.

Figure 5A:
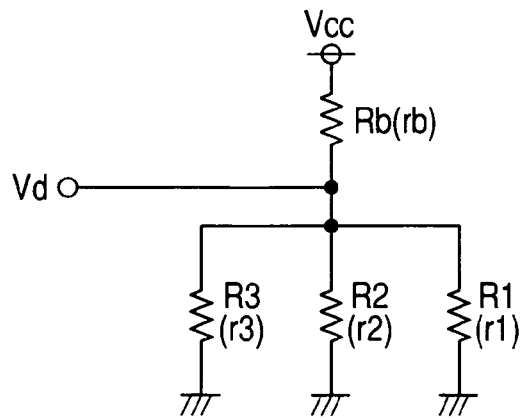
FIG. 5 shows an equivalent circuit diagram of another modified example of the disconnection detecting circuit and a voltage characteristic view.
Figure 5B:
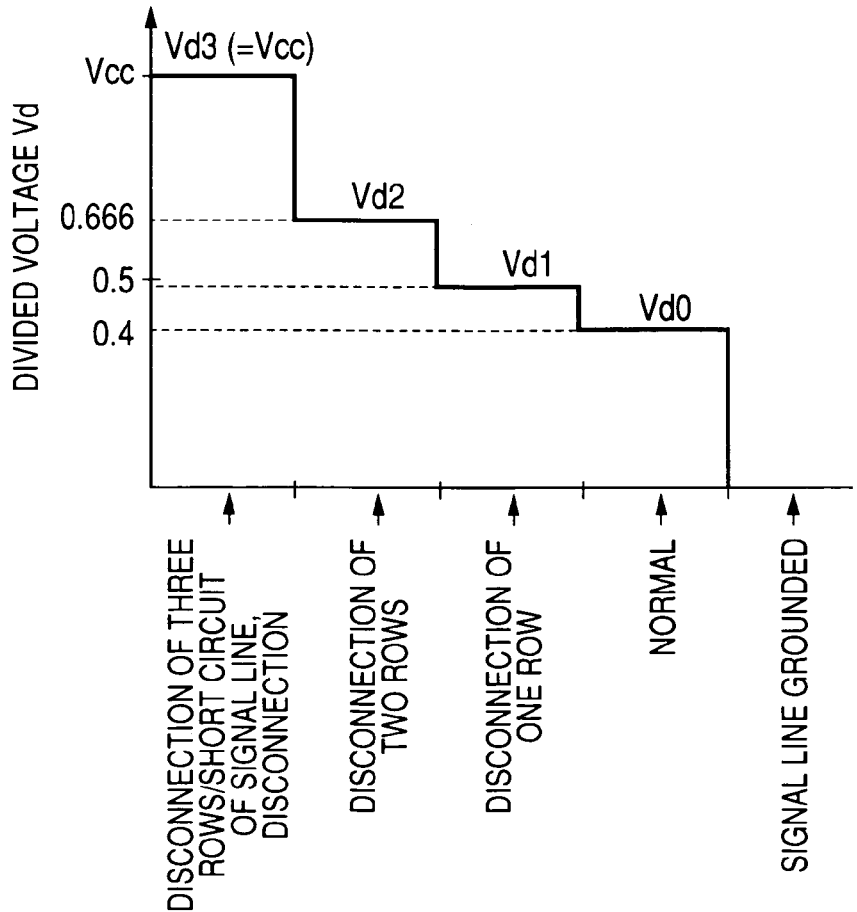

On the other hand, a potential difference between the divided voltage Vd3 (=Vcc) when all the three light emitting diode rows are abnormal and the divided voltage vd2 when only one light emitting diode row is normal (two rows are disconnected) may be decreased. In this case, the relation of ra and rb is expressed by rb<ra. For instance, as shown in FIGS. 5(a) and 5(b), assuming that rb is equal to 1/2·ra, the voltage vd0 during a normal time is expressed by:

Vd0=0.4·Vcc.

The voltage Vd1 when one light emitting diode row is abnormal (disconnected) is expressed by:

Vd1=0.5·Vcc.

The voltage Vd2 when two light emitting diode rows are abnormal (disconnected) is expressed by:

Vd2=0.666·Vcc.

Thus, the divided voltage Vd2 can be set to a high voltage side. The voltage difference between the divided voltages Vd3, Vd2 and Vd1 when disconnection of one row and two rows is detected is increased the more to enlarge a margin. Thus, a voltage range can be enlarged when the reference voltage Vref is set for deciding disconnection of a prescribed number of light emitting diode rows so that a deciding accuracy is effectively mitigated when the luminous intensity distribution standard of the tail lamp TL is decided by the reference voltage Vref for decision.

A disconnection detecting part is provided for each of the light emitting diodes so that disconnection of each of the light emitting diodes can be detected. Especially, when the number of the light emitting diodes or the number of the rows connected in parallel is large, as shown in FIG. 5, the resistance value of the reference resistance Rb is set to be lower than the resistance value of the detecting resistance (collector resistance). Thus, the technique for enlarging the deciding margin can be extremely effective.

Figure 6A:
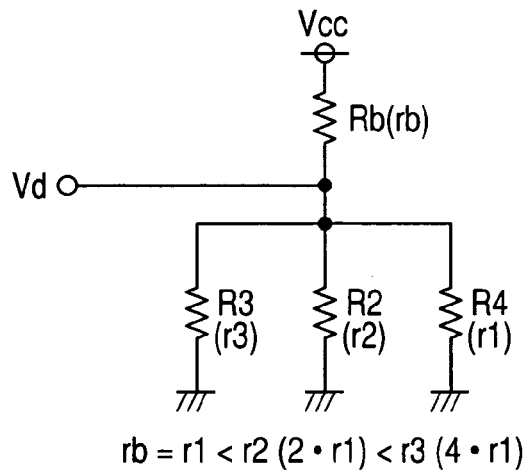
FIG. 6 shows an equivalent circuit diagram of another modified example of the disconnection detecting circuit and a voltage characteristic view.

Further, the values of the collector resistances R1, R2 and R3 of the first to third disconnection detecting parts D1, D2 and D3 may differ from one another. For instance, as shown in FIG. 6(a), the value of rd is expressed by rd=r1<r2 (=2·r1)<r3 (=4·r1). Here, the value of rx for obtaining the divided voltage Vd when an abnormality arises in the first light emitting diode row L1 is expressed by rx=1/(1/r2+1/r3). The value of rx when an abnormality arises in the second light emitting diode row L2 is expressed by rx=1/(1/r1+1/r3). The value of rx when an abnormality arises in the third light emitting diode row L3 is expressed by rx=1/(1/r1+1/r2). Further, the value of rx when abnormalities arise at the same time in the first light emitting diode row L1 and the second light emitting diode row L2 is expressed by rx=1/r3. The value of rx when abnormalities arise at the same time in the first light emitting diode row L1 and the third light emitting diode row L3 is expressed by rx=1/r2. The value of rx when abnormalities arise at the same time in the second light emitting diode row L2 and the third light emitting diode row L3 is expressed by rx=1/r1. In any case, the divided voltage Vd is obtained on the basis of rx.

Figure 6B:
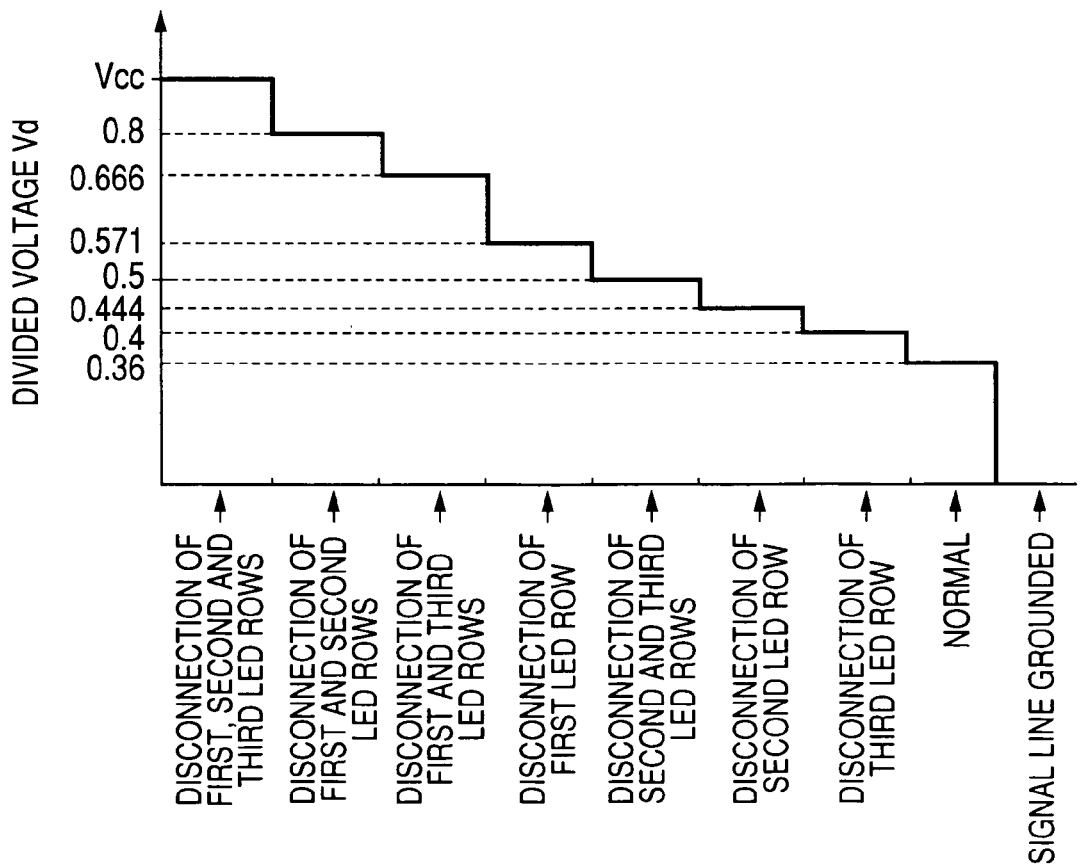

Accordingly, when the abnormality arises respectively in the first light emitting diode row L1, the second light emitting diode row L2 and the third light emitting diode row L3, and when the abnormalities arise simultaneously in two or all three of these light emitting diode rows L1, L2 and L3, the divided voltage Vd is obtained as shown in FIG. 6(b). The deciding circuit 5 determines the divided voltage Vd so that the deciding circuit can properly identify the abnormalities respectively of the first to third light emitting diode rows L1 to L3. In this case, the reference value rb of the reference resistance Rb is set to be lower than the resistance values r1, r2 and r3 of the collector resistances (detecting resistances) R1, R2 and R3 to increase the deciding margin when qn abnormality is identified in the deciding circuit 5. Although methods for deciding the luminous intensity distribution standard or methods for treating the abnormality are different depending on the positions of the disconnected light emitting diodes, the reference resistance set to be lower than the collector resistances is advantageous to meet such cases.

Further, in the first embodiment, as the reference resistance Rb is provided in the control unit CNT side, when the signal line SL for connecting the tail lamp TL to the control unit CNT is disconnected, or when the reference resistance Rb is short-circuited to power, the divided voltage Vd becomes Vcc. Thus, it is determined that the tail lamp TL is abnormal as in the case when all the light emitting diode rows become abnormal. When the signal line SL is short-circuited to earth and grounded, the divided voltage Vd becomes an earth potential, that is, 0V. Also in this case, the tail lamp TL is determined to be abnormal. These decisions are made to enable the abnormality in the signal line to be detected and identified, including the abnormality of the tail lamp TL, by deciding that the tail lamp TL is abnormal when the abnormality arises in the signal line SL.

Figure 7:
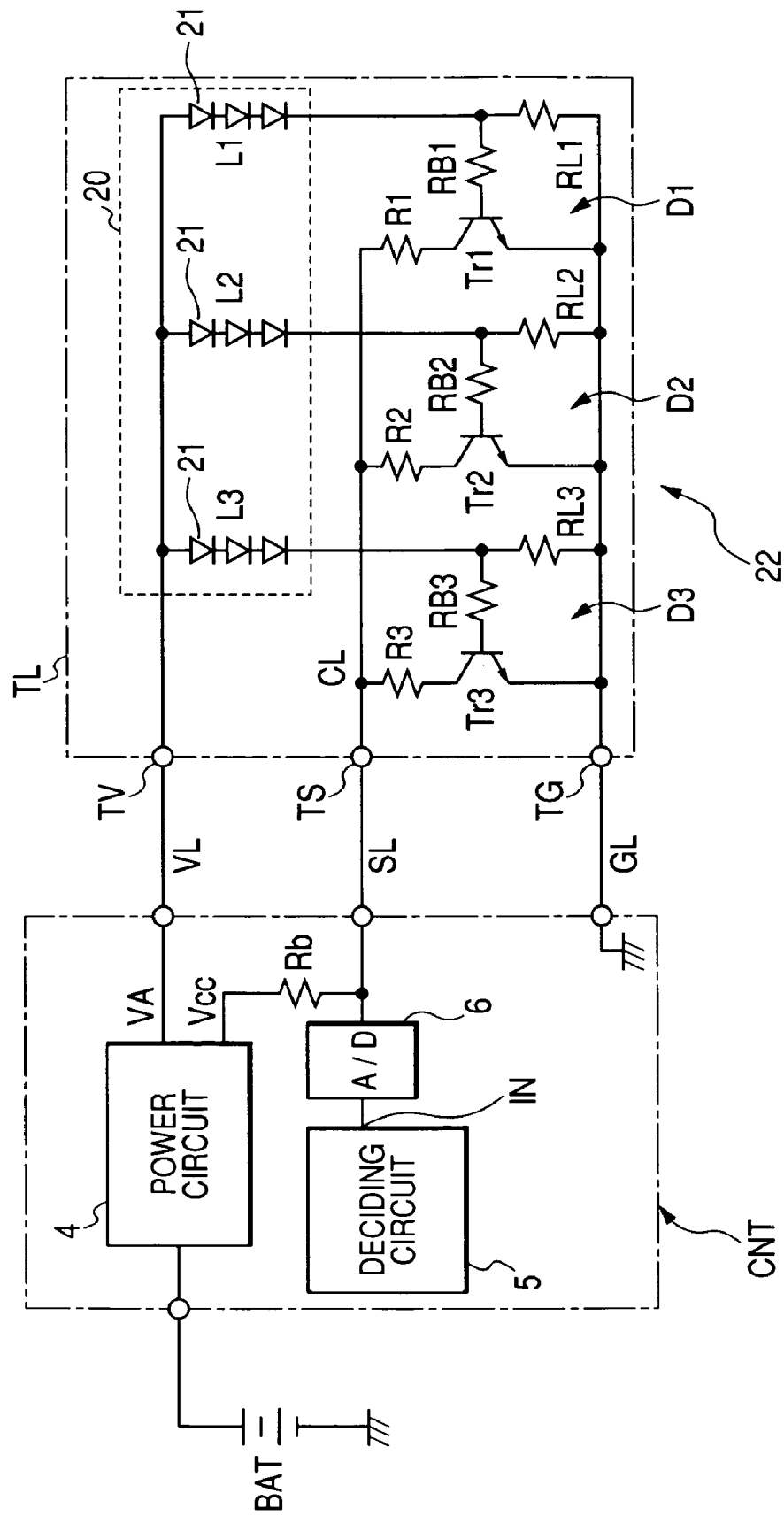
FIG. 7 is a circuit block diagram of a modified example of the first embodiment.

In the first embodiment, the abnormality is decided in the deciding circuit 5 of the control unit CNT in accordance with the divided voltage Vd of the signal line SL. As shown in FIG. 7, the deciding circuit 5 may be composed of a microcomputer, an A/D (analog/digital) converting circuit 6 may be interposed in an input terminal IN side, and the divided voltage Vd may be provided to the deciding circuit 5 as a digital value so that the deciding circuit 5 decides an abnormality in accordance with the digital value. Further, transistors forming disconnection detecting parts D1, D2 and D3 respectively in the tail lamp TL may be MOS type transistors.

SECOND EMBODIMENT

In some kinds of lamps, three or more of the light emitting diode rows rarely are abnormal at the same time. Instead, small numbers (such as one or two) of the light emitting diode rows are most frequently abnormal. In the first embodiment, an example of three light emitting diode rows is described. However, in the first embodiment, when there are many light emitting diode rows, if the abnormalities of two light emitting diode rows are detected, the problem of a margin of the divided voltage Vd may sometimes arise. For instance, in the first embodiment shown in FIG. 3, assuming that the number of rows of the light emitting diode rows is nine under the condition that the resistance values of r1, r2 and r3 of the resistances R1, R2 and R3 are equal to the resistance value rb of the resistance Rb, the voltage characteristics of the divided voltage Vd are shown in FIG. 11(a). As apparent from the drawing, when the number of the light emitting diode rows is large, a voltage difference between the divided voltage Vd2 when two light emitting diode rows become abnormal and the divided voltage Vd0 during a normal time is extremely small (e.g., as low as 0.04·Vcc). Thus, it is difficult to obtain a margin when the voltage difference is decided to determine an abnormality and carry out a highly accurate decision. Thus, in a second embodiment, for the voltage difference between the divided voltage Vd0 during normal time and the divided voltage when one row or two rows are abnormal, the divided voltage Vd2 when the two rows are abnormal is enlarged to increase the margin for deciding the abnormality.

Figure 8:
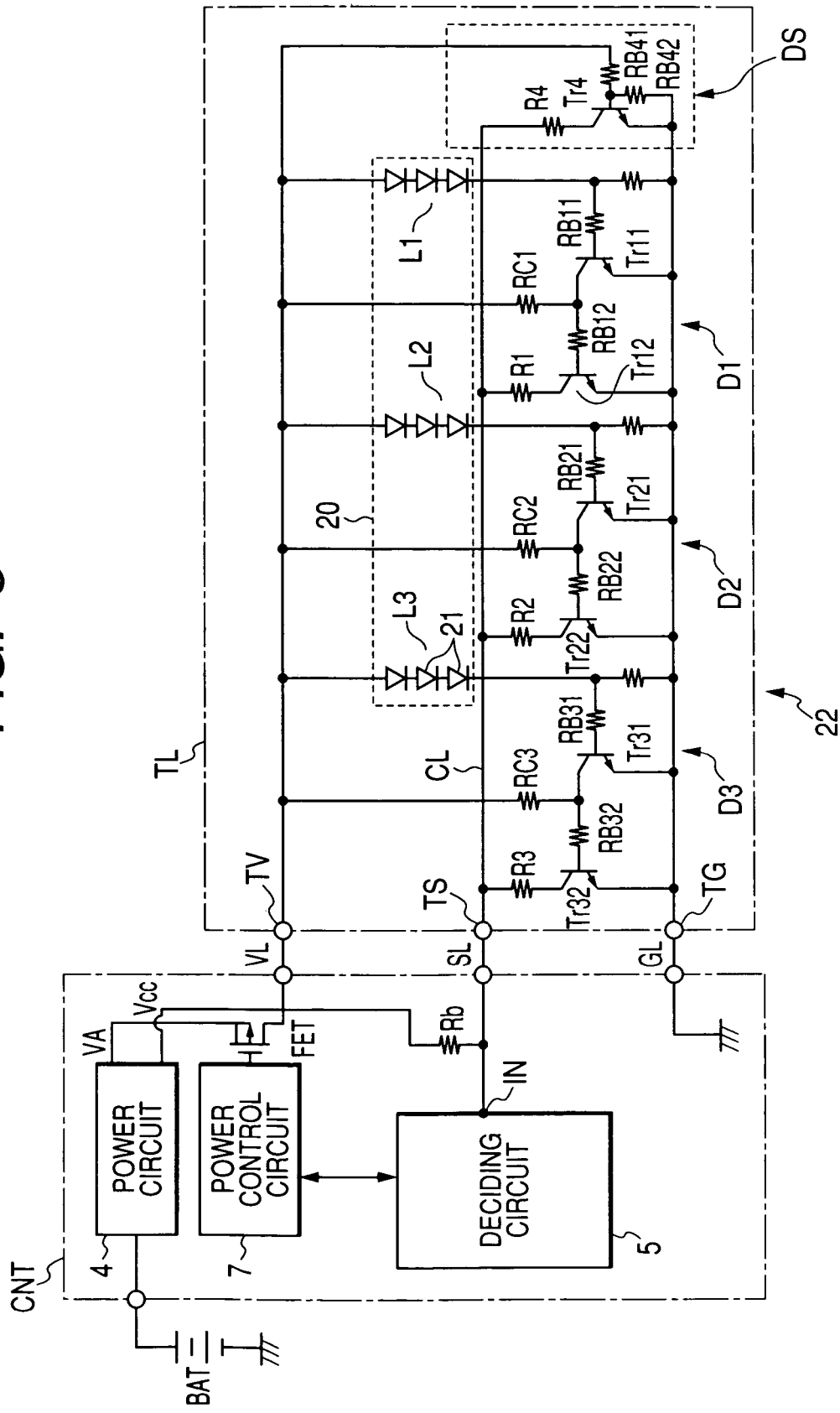
FIG. 8 is a circuit block diagram of a second embodiment.

FIG. 8 is a circuit block diagram of an example of the second embodiment. Parts equivalent to those of the first embodiment shown in FIG. 1 are designated by the same reference numerals. In the second embodiment, an example is illustrated in which a lamp is formed with three light emitting diode rows having three light emitting diodes connected in series, as in the first embodiment. In FIG. 8, disconnection detecting parts D1, D2 and D3 forming a disconnection detecting part 22 are respectively connected to the light emitting diode rows L1, L2 and L3. The disconnection detecting parts D1, D2 and D3 are respectively formed with two NPN transistors. For instance, the disconnection detecting part D1 includes first and second transistors Tr11 and Tr12. A load resistance RL1 connected in series to the light emitting diode row L1 and voltage generated at both ends of the load resistance RL1 are connected to be inputted to the base of the first transistor through a base resistance RB11. The collector of the first transistor Tr11 is connected to supply voltage VA through a collector resistance RC1 and connected to the base of the second transistor Tr12 through a base resistance RB12. The collector of the second transistor Tr12 is connected to a common line CL connected to a signal terminal TS through a collector resistance R1 as a detecting resistance.

In the disconnection detecting part D1, when the light emitting diode row L1 is disconnected, the voltage at both the ends of the load resistance RL1 falls so as to turn off the first transistor Tr11. Therefore, a potential is supplied to the base of the second transistor Tr12 through the collector resistance RC1 to turn on the second transistor Tr12. The collector resistance R1 is connected to the common line CL so that collector current by operating voltage is supplied through the signal line SL. Thus, voltage Vd—obtained by dividing the operating voltage Vcc by a reference resistance Rb and the collector resistance R1—is provided to an input terminal IN of a deciding circuit 5. That is, the collector resistance R1 serves as the detecting resistance for detecting the abnormality of the light emitting diode row L1, as in the first embodiment.

The disconnection detecting parts D2 and D3 may have the same structures as that of the disconnection detecting part D1. The disconnection detecting parts D2 and D3 are respectively mainly formed with first and second transistors Tr21 and tr22, and Tr31 and Tr32. The first transistors tr21 and Tr31 are turned on by both voltages of load resistances RL2 and RL3 respectively connected to the light emitting diode rows L2 and L3. However, when the light emitting diode rows L2 and L3 are disconnected, the first transistors Tr21 and tr31 are turned off. In accordance with the off-state, potentials are supplied to the bases of the second transistors Tr 22 and Tr32 through collector resistances RC2 and RC3 to turn on the second transistors Tr22 and Tr32 and connect collector resistances R2 and R3 as detecting resistances to the common line CL. Thus, the operating voltage Vcc is divided by the collector resistances R2 and R3 and the reference resistance Rb.

Further, in the second embodiment, a signal line disconnection detecting part DS for detecting the disconnection of the signal line SL is provided. The signal line disconnection detecting line DS may be formed with one NPN transistor Tr4. The base of the transistor Tr4 is connected to a connecting point of base resistances RB41 and RB42 connected between a power terminal TV and an earth terminal TG. The collector of the transistor Tr4 is connected to the common line CL through a collector resistance R4 functioning as a detecting resistance for detecting the disconnection of the signal line.

Further, the structure of the control unit CNT may be substantially the same as that of the first embodiment. The control unit CNT includes a power circuit 4 and a deciding circuit 5. The power circuit 4 generates light emitting voltage VA for driving the light emitting diodes to emit light by using a battery BAT mounted on a vehicle as a power source and for providing the operating voltage Vcc of the deciding circuit 5. In addition to this structure, the control unit CNT of the second embodiment is provided with a power control circuit 7 having a switching transistor FET composed of a field effect transistor interposed to the VA terminal of the power circuit to turn on and off the switching transistor FET. The power control circuit 7 can be controlled by the deciding circuit 5. The deciding circuit 5 is constructed so as to turn on and off the switching transistor FET through the power control circuit 7 and recognize the on and off state at the same time. Then, the light emitting voltage VA through the switching transistor FET is supplied to the power terminal TV of a tail lamp TL by a power supply wire VL. Further, the operating voltage Vcc is connected to a signal terminal TS connected to the common line CL as in the first embodiment.

Figure 9A:
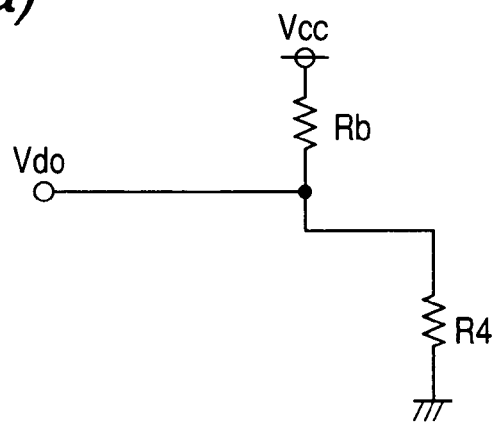
FIG. 9 is an equivalent circuit diagram for explaining a detecting operation of a disconnection detecting circuit.

According to the structure of the second embodiment, the power control circuit 7 turns on the switching transistor FET so that the light emitting voltage VA of the power circuit 4 is supplied to the power terminal TV through the power supply wire VL to emit light in a light emitting part 20 of the tail lamp TL, that is, emit light respectively in the light emitting diode rows L1, L2 and L3. Further, when the signal line SL is normal, the deciding circuit 5 detects the voltage of the common line CL through the signal terminal TS and the signal line SL. When the light emitting diode rows L1, L2 and L3 normally emit the light, the first transistors Tr11, Tr21 and Tr31 of the disconnection detecting parts D1, D2 and D3 are respectively turned on, so that the second transistors Tr12, Tr22 and Tr32 are turned off, and electric current is not supplied to the detecting resistances R1, R2 and R3. On the other hand, in the signal line disconnection detecting part DS, as the transistor Tr4 is turned on, the electric current is supplied to the detecting resistance R4. As a result, as shown in an equivalent circuit shown in FIG. 9(a), the reference resistance Rb and the detecting resistance R4 are connected to the common line CL. The potential of the common line CL detected by the deciding circuit 5 is expressed by:

$$Vd0=[r4/(rb+r4)] \cdot Vcc.$$

Figure 9B:
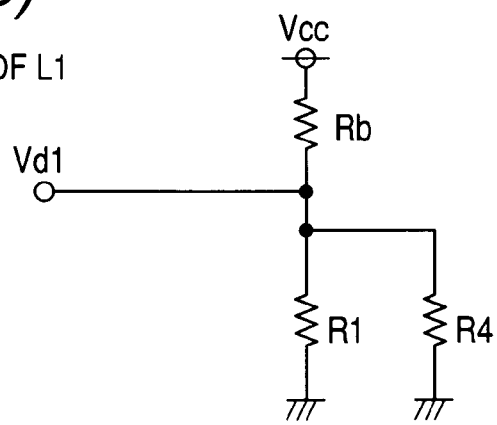

When any one of the light emitting diode rows L1, L2 and L3—for instance, the light emitting diode row L1—is disconnected, the first transistor Tr11 of the disconnection detecting part D1 is turned off, so that the second transistor Tr12 is turned on to supply the electric current to the detecting resistance R1. As a result, as shown in an equivalent circuit shown in FIG. 9(b), the reference resistance Rb and the detecting resistances R1 and R4 are connected to the common line CL and the potential of the common line CL detected by the deciding circuit 5 is expressed by:

$$Vd1=[ry/(rb+ry)] \cdot Vcc \quad \text{(formula d)}$$

$$\text{where, } ry=1/(1/r1+1/r4) \quad \text{(formula e)}$$

When either the light emitting diode row L2 or L3 is disconnected, the potential of the common line CL may be obtained in the same manner. Thus, r1 in the formula (e) may be replaced by r2 or r3.

Figure 9C:
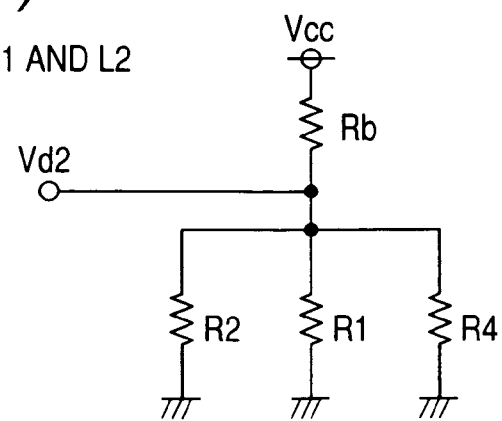

When two rows of the light emitting diode rows L1, L2 and L3 are disconnected at the same time, for instance, when the light emitting diode rows L1 and L2 are disconnected, an equivalent circuit is obtained as shown in FIG. 9(c). In this case, ry in the formula (e) may be expressed by:

$$ry=1/(1/r1+1/r2+1/r4) \quad \text{(formula e')}$$

Further, when the light emitting diode row L3 is disconnected simultaneously with the light emitting diode row L1 or L2, the potential of the common line can be obtained in the same method. Still further, when the light emitting diode rows L1, L2 and L3 are disconnected at the same time, the potential can be obtained by the same method.

Figure 10A:
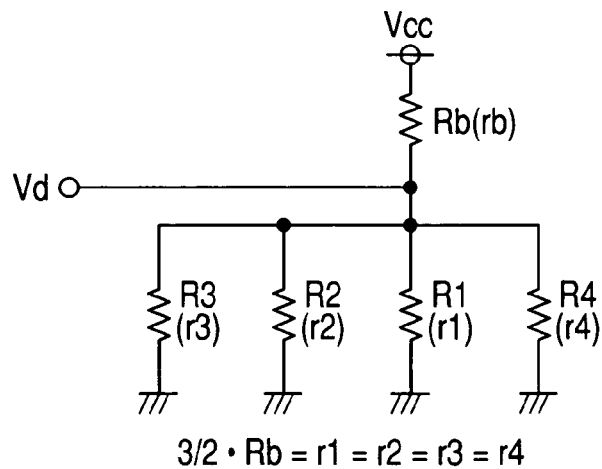
FIG. 10 is a voltage characteristic view of the disconnection detecting circuit.
Figure 10B:
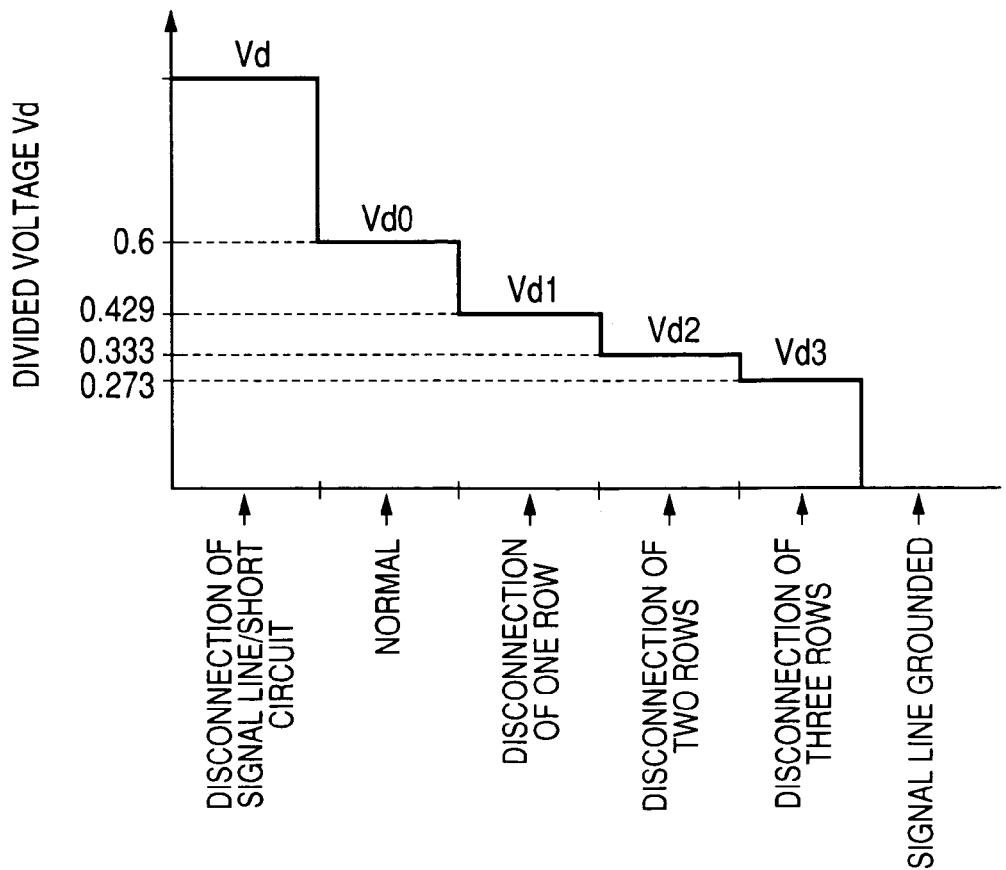
Figure 12:
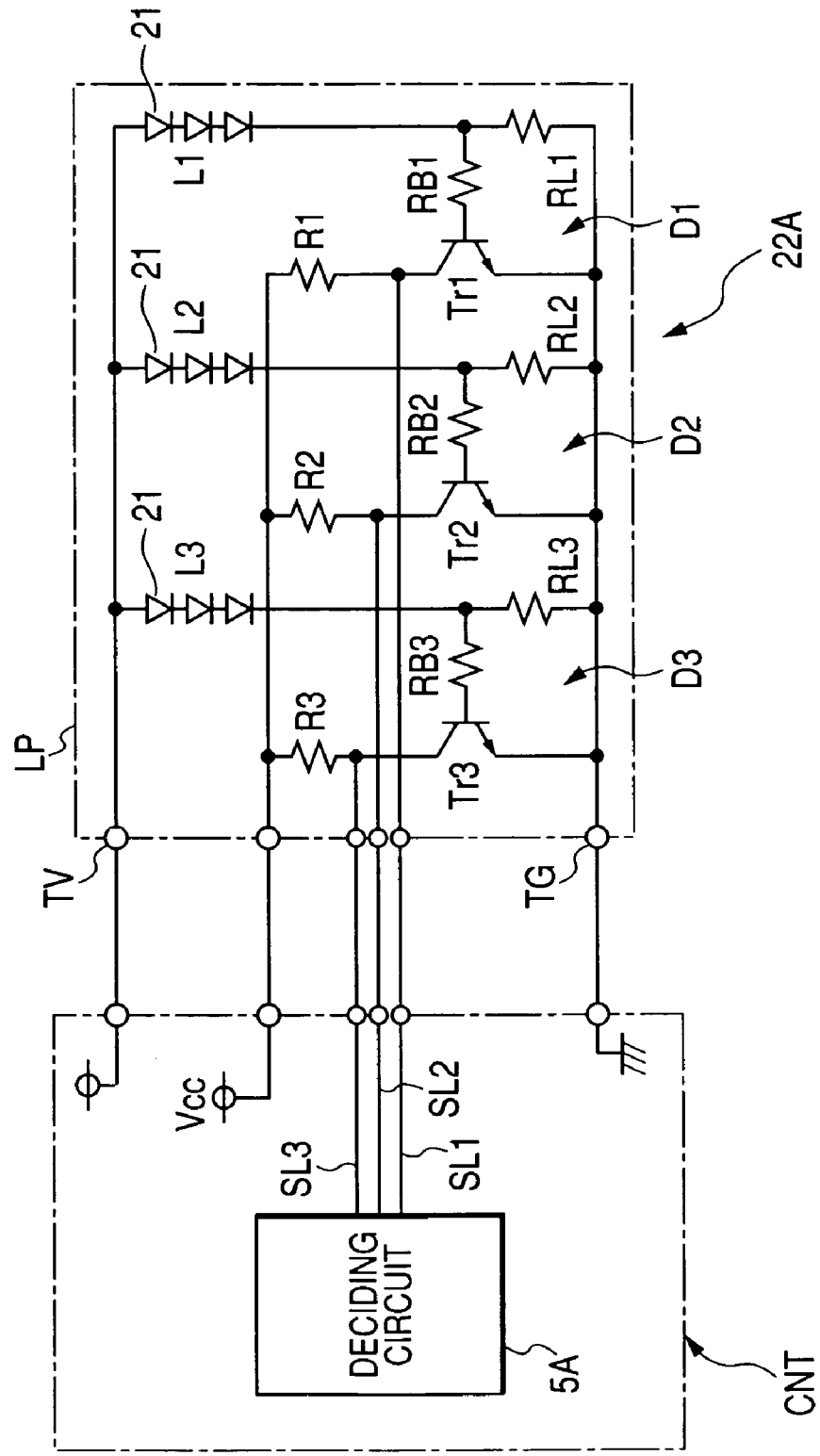
FIG. 12 is a circuit block diagram of a typical disconnection detecting circuit.

In the second embodiment, even when the resistance values r1, r2, r3, r4 and rb of the detecting resistances R1, R2 and R3, the detecting resistance R4 and the reference resistance Rb are equal, that is, when rb=r1=r2=r3=r4, a sufficient effect can be realized. When the reference value rb of the reference resistance Rb is sufficiently lower than the resistance values of the detecting resistances R1, R2, R3 and R4, respectively, the effect can be increased. For instance, as shown in FIG. 10(a), when 3/2·rb is equal to r1, r2, r3 and r4, the divided voltage Vd to be decided by the deciding circuit 5 is calculated to obtain voltage characteristics as shown in FIG. 10(b). As indicated by the drawing, the voltage Vd0 during a normal time is expressed by:

$$Vd0=(3/5) \cdot Vcc=0.6 \cdot Vcc.$$

Voltage Vd1 when one light emitting diode row becomes abnormal is expressed by:

$$Vd1=(3/7) \cdot Vcc=0.429 \cdot Vcc.$$

When the two light emitting diode rows become abnormal (disconnected), voltage Vd2 is expressed by:

$$Vd2=(1/3) \cdot Vcc=0.333 \cdot Vcc.$$

When all three light emitting diode rows become abnormal, voltage Vd3 is expressed by:

$$Vd3=(3/11) \cdot Vcc=0.273 \cdot Vcc.$$

Accordingly, in the second embodiment, the resistance values r1, r2, r3, r4 and rb of the detecting resistances R1, R2 and R3 and the detecting resistance R4 and the reference resistance Rb are equal, that is, rb=r1=r2=r3=r4. In this case, when the number of the light emitting diode rows is increased, for instance, if the number of the light emitting diode rows is nine as shown in FIG. 11(a), the voltage characteristics of the divided voltage Vd are as shown in FIG. 11(b). That is, Vd0 during a normal time is expressed by:

$$Vd0=(1/2)\cdot Vcc=0.5\cdot Vcc.$$

Voltage Vd1 when one light emitting diode row becomes abnormal (disconnected) is expressed by:

$$Vd1=(1/3)\cdot Vcc=0.333\cdot Vcc.$$

When the two light emitting diode rows are abnormal, voltage Vd2 is expressed by:

$$Vd2=(1/4)\cdot Vcc=0.25\cdot Vcc.$$

When all the three light emitting diode rows are abnormal, voltage Vd3 is expressed by:

$$Vd3=(1/5)\cdot Vcc=0.2\cdot Vcc.$$

In this case, a voltage difference ΔVd between the divided voltage Vd2 when the two light emitting diode rows are abnormal and the divided voltage Vd0 during the normal time is 0.25·Vcc and is larger than the voltage difference of 0.04·Vcc in the first embodiment shown in FIG. 11(a). Accordingly, when the abnormality of the two rows of the light emitting diode rows is decided on the basis of the reference voltage Vref in the deciding circuit 5, a margin can be obtained to realize a highly accurate decision.

Further, the resistance value rb of the reference resistance Rb is sufficiently smaller than the resistance values of the detecting resistances R1, R2, R3 and R4, respectively For instance, as shown in FIG. 10, the resistance values of the reference resistance Rb and the detecting resistances R1, R2, R3 and R4 are respectively set to be 3/2·rb=r1=r2=r3=r4. In this case, if the light emitting diode rows are composed of nine rows, the voltage characteristics of the divided voltage Vd are obtained as shown in FIG. 11(c). The voltage characteristics are the same as the characteristics shown in FIG. 10(b). A voltage difference ΔVd between the divided voltage Vd2 when the two light emitting diode rows are abnormal and the divided voltage Vd0 during the normal time is 0.266·Vcc, which is larger than the voltage difference of 0.04·Vcc of the first embodiment shown in FIG. 11(a) and larger than the voltage difference ΔVd=0.25·Vcc shown in FIG. 11(b). Accordingly, when the abnormality of the two rows of the light emitting diode rows is decided on the basis of the reference voltage Vref in the deciding circuit 5, a margin can be obtained to realize a highly accurate decision.

In the second embodiment, an effect can be obtained even when rb, r1, r2, r3 and r4 are all equal, as in the first embodiment. However, as described above, when the relation of rb≦r1=r2=r3=r4 or rb≦r4<r1=r2=r3 is provided in such a way that the resistance value of the reference resistance is lower than the resistance values of the detecting resistances, for instance, 3/2·rb=r1=r2=r3=r4, the voltage difference between the voltages Vd0 and Vd1 or Vd2 can be likewise increased to obtain a deciding margin when one or two rows are abnormal. Further, in the second embodiment, the voltage difference of Vd1−Vd2 between the divided voltage Vd1 when one row is abnormal and the divided voltage Vd2 when the two rows are abnormal can be enlarged as illustrated in the first embodiment and the deciding margin in the voltage difference of Vd1−Vd2 can be obtained.

Also, in the second embodiment, when the signal line SL is disconnected, the transistor Tr4 of the signal line disconnection detecting part DS is turned off, so that the electric current is not supplied to the detecting resistance R4 connected to the common line CL, Vd is equal to Vcc and the deciding circuit 5 decides the signal line SL to be disconnected. When the switching transistor FET is turned off by the power control part 7 so that the power supply voltage VA is not supplied to the tail lamp TL, the transistor Tr4 of the signal line disconnection detecting part DS is turned off and Vd is equal to Vcc. However, as a result of recognizing that the switching transistor FET is turned off, the deciding circuit 5 does not decide that the signal line SL is disconnected. Further, when the signal line is short-circuited to Vcc, what is called a short-circuit to power, Vd is equal to Vcc. In this case, the deciding circuit 5 can recognize that the switching transistor FET is turned on to discriminate the disconnection of the signal line SL. When the signal line SL is grounded, Vd is equal to 0.

In the particular examples of the foregoing first and second embodiments, the lamp is formed with the three light emitting diode rows, respectively having the three light emitting diodes connected in series. However, as described above, the techniques may be applied to a lamp having an arbitrary number of light emitting diode rows. Further, the present techniques are not limited to a tail lamp and may be applied to other lamps using multiple light emitting elements as a light source, such as a stop lamp, a turn signal lamp or ahead lamp. Further, the light emitting element is not limited to a semiconductor light emitting element and may be any element that emits light by supplying electric current.

Other implementations are within the scope of the claims.

What is claimed is:

1. A lighting system for a vehicle comprising:
    a lamp including a light emitting part having a plurality of light emitting elements connected in parallel and a disconnection detecting circuit for detecting the disconnection of each light emitting element; and
    a deciding circuit connected to the disconnection detecting circuit by one signal line to detect an abnormality of a particular one of the light emitting elements, wherein the disconnection detecting circuit is adapted to provide to the signal line a potential corresponding to the particular light emitting element whose disconnection is detected and the deciding circuit is adapted to identify the abnormal light emitting element on the basis of the potential of the signal line;
    wherein the disconnection detecting circuit includes a reference resistance connected between the signal line and a first potential and a detecting resistance connected between the signal line and a second potential, if a disconnection detecting part does not detect the respective disconnection.

2. A lighting system according to claim 1, wherein the resistance value of the reference resistance is lower than the resistance value of the detecting resistance.

3. A lighting system for a vehicle according to claim 2, wherein the disconnection detecting circuit includes a detecting resistance for detecting the disconnection of the signal line that is connected between the signal line and the second potential and is constructed so as not to supply electric current when the signal line is disconnected or a supply power source to the light emitting part stops.

4. A lighting system for a vehicle according to claim 1, wherein the disconnection detecting circuit has a plurality of disconnection detecting parts for detecting respectively disconnection of one or more of the plurality of light emitting elements and for providing respectively different potentials in accordance with the detection of the disconnection in the disconnection detecting parts.

5. A lighting system according to claim 4, wherein the resistance value of the reference resistance is lower than the resistance value of the detecting resistance.

6. A lighting system for a vehicle according to claim 5, wherein the disconnection detecting circuit includes a detecting resistance for detecting the disconnection of the signal line that is connected between the signal line and the second potential and is constructed so as not to supply electric current when the signal line is disconnected or a supply power source to the light emitting part stops.

7. A lighting system for a vehicle comprising:
a lamp including a light emitting part having a plurality of light emitting elements connected in parallel and a disconnection detecting circuit for detecting the disconnection of each light emitting element; and
a deciding circuit connected to the disconnection detecting circuit by one signal line to detect an abnormality of a particular one of the light emitting elements, wherein the disconnection detecting circuit is adapted to provide to the signal line a potential corresponding to the particular light emitting element whose disconnection is detected and the deciding circuit is adapted to identify the abnormal light emitting element on the basis of the potential of the signal line;
wherein the disconnection detecting circuit includes a reference resistance connected between the signal line and a first potential and a detecting resistance connected between the signal line and a second potential if a disconnection detecting part detects the respective disconnection.

8. A lighting system for a vehicle according to claim 7, wherein the disconnection detecting circuit includes a detecting resistance for detecting the disconnection of the signal line that is connected between the signal line and the second potential and is constructed so as not to supply electric current when the signal line is disconnected or a supply power source to the light emitting part stops.

9. A lighting system according to claim 7, wherein the resistance value of the reference resistance is lower than the resistance value of the detecting resistance.

10. A lighting system for a vehicle according to claim 9, wherein the disconnection detecting circuit includes a detecting resistance for detecting the disconnection of the signal line that is connected between the signal line and the second potential and is constructed so as not to supply electric current when the signal line is disconnected or a supply power source to the light emitting part stops.

11. A lighting system for a vehicle according to claim 7, wherein the disconnection detecting circuit has a plurality of disconnection detecting parts for detecting respectively disconnection of one or more of the plurality of light emitting elements and for providing respectively different potentials in accordance with the detection of the disconnection in the disconnection detecting parts.

12. A lighting system for a vehicle according to claim 11, wherein the disconnection detecting circuit includes a detecting resistance for detecting the disconnection of the signal line that is connected between the signal line and the second potential and is constructed so as not to supply electric current when the signal line is disconnected or a supply power source to the light emitting part stops.

13. A lighting system according to claim 11, wherein the resistance value of the reference resistance is lower than the resistance value of the detecting resistance.

14. A lighting system for a vehicle according to claim 13, wherein the disconnection detecting circuit includes a detecting resistance for detecting the disconnection of the signal line that is connected between the signal line and the second potential and is constructed so as not to supply electric current when the signal line is disconnected or a supply power source to the light emitting part stops.

* * * * *